Nov. 14, 1939.   H. HOLLER ET AL   2,180,085
APPARATUS FOR THE PREPARATION OF ACETYLENE
Filed Nov. 6, 1936   2 Sheets-Sheet 2
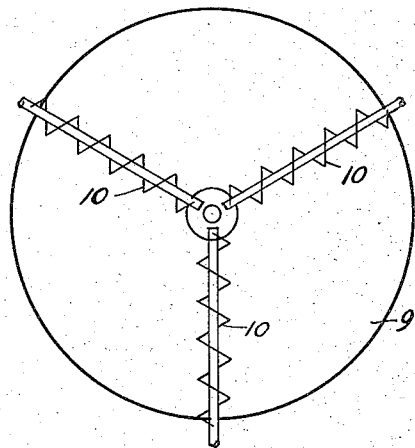
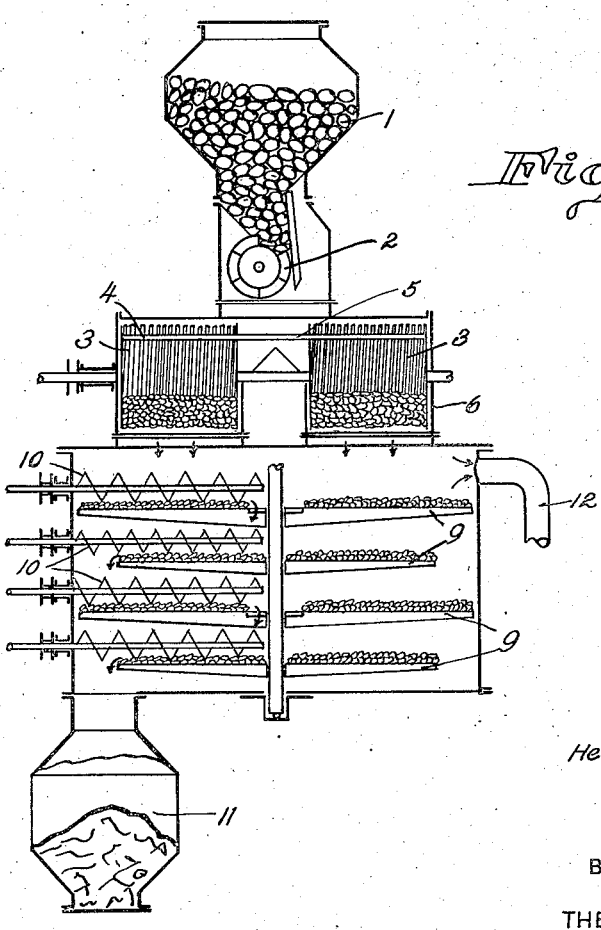
Hermann Holler
Otto Mues
INVENTORS
THEIR ATTORNEYS Patented Nov. 14, 1939

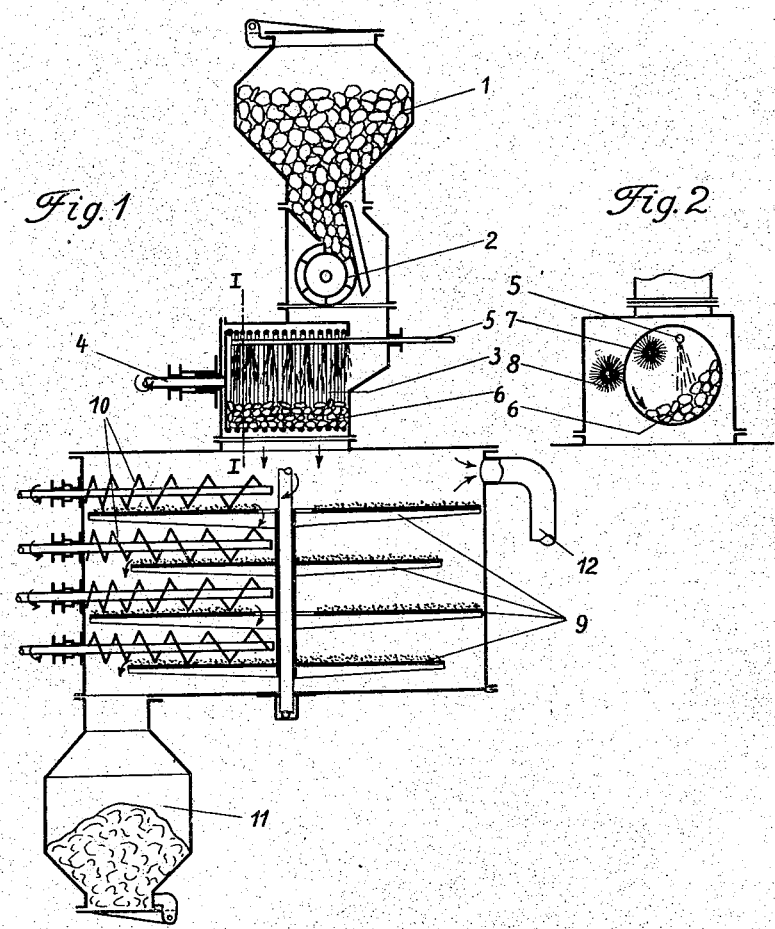

2,180,085

UNITED STATES PATENT OFFICE 2,180,085

APPARATUS FOR THE PREPARATION OF ACETYLENE

Hermann Holler and Otto Mues, Frankfort-on-the-Main, Germany, assignors to I. G. Farbenindustrie Aktiengesellschaft, Frankfort-on-the-Main, Germany Application November 6, 1936, Serial No. 109,510
In Germany November 9, 1935

9 Claims. (Cl. 48—33)

The present invention relates to an apparatus for the preparation of acetylene from calcium carbide and water.

In the generation of acetylene from calcium carbide by the action of water, two processes are known which differ from one another as far as concerns the residue which remains when the process is completed. The older process is described as the "wet process" and the newer process is described as "dry generation." In the former the residue consists of calcium hydrate which is obtained as a mud-like mass in an excess of water. In the second process the residue is in a pulverulent, dry form which can be used to considerably greater advantage than the residue from the first process. The dry process is, therefore, used to an increasing extent.

There are, however, certain difficulties in the dry process which lessen its efficiency. One such difficulty is the control of the heat of the reaction. As is known, about 400 kilogram calories of heat are set free per kilogram of calcium carbide, which, if not dissipated sufficiently quickly, may cause polymerization within the generator with deleterious consequences. The regulation of the addition of water likewise requires particular care because, if too much water is added, a pulverulent product is not obtained, but the lime is agglomerated to form lumps unsuited for use.

Various methods of overcoming these difficulties have been tried. By one such method the generation is carried out in a long drum, the dimensions of which are such that the calcium carbide introduced together with the generating water at the one end of the drum can leave the other end of the drum as pulverulent lime. It is evident that in view of the properties of calcium carbide the operation of the drum has to be controlled with extreme care in order to obtain the desired product at the outlet of the drum. By another method the calcium carbide is gasified on plates provided with a stirring device, which stirs the calcium hydroxide and calcium carbide and intimately mixes the reacting material and thus effects a better distribution of the heat of the reaction.

Both these methods have the drawback that the elimination of the heat produced is difficult and may be insufficiently rapid. A further disadvantage lies in the fact that a layer of calcium hydroxide, through which water can penetrate only with difficulty, surrounds the pieces of calcium carbide, so that the velocity of the gasification in both cases remains relatively small and the calcium carbide remains associated with the residue until the gasification is complete.

The formation of polymerization products is likewise not prevented by the known processes. As each grain of calcium carbide is embedded in calcium oxide and calcium hydrate, the gas and the water vapor which are formed during the gasification can escape only with difficulty. A pocket of gas is formed round the grain of calcium carbide and the water vapor contained in the gas reacts with the calcium carbide and causes it to gasify. Owing to the absence of the cooling action of water, the temperature rises and soon reaches the upper limit of 150° C. In these circumstances the formation of polymerization products is possible.

By the present invention these drawbacks are avoided by separating the calcium oxide and calcium hydrate from the grain of calcium carbide as soon as they are produced. This is attained by gasifying the calcium carbide in two phases in an apparatus which comprises a chamber containing one or more sieve-like members adapted to retain and keep in motion pieces of calcium carbide while they are sprayed with water, and a surface of relatively great extension adapted to receive pulverulent material from the sieve-like member or members, means being provided to keep in motion the material on the said surface so that good contact is maintained between the particles of material and the atmosphere of the chamber. The sieve-like member may advantageously be a revolving screen which contains the calcium carbide to be gasified and below which there is arranged a system of one or more revolving plates above each of which there is arranged a device for moving the reaction material over the plates, for instance, a stirring worm. The revolving plates altogether have herein a relatively large area when compared with that of the surface of the revolving screens.

All the aforesaid parts are enclosed by a casing to prevent the undesirable escape of the acetylene generated.

Whereas in known generators only pulverulent calcium carbide can be treated, by the new arrangement it is possible to use non-classified grains of calcium carbide. The subdivision of the generating process has the advantage that in the first phase the gasification velocity is accelerated because the calcium hydroxide which is mixed with a small quantity of small pieces of calcium carbide which are not yet gasified is separated from the drum. The pieces of calcium carbide which remain exposed to the action of the generating water in the drum are, therefore, comparatively pure and free from any covering of lime. The velocity of the gasification is thus increased and the danger of polymerization is excluded. In the second phase, which takes place on the revolving plates, the evolution likewise occurs without any polymerization. In order to complete the gasification of the small quantity of gains of calcium carbide which reach the plates, the material which has passed through the sieve is rotated by means of a stirring device until the grains of calcium carbide are gasified by the traces of water still contained in the residue of lime or of water vapor contained in the acetylene.

The stirring of the residue serves to produce a uniform product. As is known, technical calcium carbide contains up to about 15 per cent. of impurities which are distributed irregularly. Unstirred residue would, therefore, show the same irregularity of distribution of impurities. By stirring the residue the impurities are uniformly distributed, this being of advantage in the uses to which the residue is applied.

In order to avoid the polymerization when the generator is not in use and the moisture contained therein enters into reaction with the calcium carbide not yet gasified, the motion of the calcium carbide is maintained when withdrawal of the gas is temporarily suspended, be it for a short or prolonged period. In order to prevent polymerization it is therefore advisable to disengage the generator only after the free moisture contained therein has been utilized.

In order that the gasification should proceed smoothly, it is necessary that the calcium carbide and the product obtained during the gasification should move continuously through the plant. To this end the openings of the revolving screen should be large enough to avoid clogging. Furthermore, it is advisable to provide means for keeping the openings always clean and free for example brushes, scrapers or the like which are suitably mounted in such a manner that they act on both sides of the revolving screen. In this case care has to be taken that during the cleaning process no sparks are produced by the friction of the brushes at the wall of the drum. A material which does not produce sparks is, therefore, preferably used for the drum or the brushes, or both, the other part being made of steel. The only limitation of importance on the material used is that no sparks are produced by friction between the rubbing parts.

In the second phase no disturbances in the movement of the product obtained are likely to occur so that in this case it is not necessary to provide cleaning devices or the like.

In the accompanying drawings an acetylene generator according to the invention is diagrammatically illustrated by way of example.

Fig. 1 is a vertical section through the entire plant and

Fig. 2 is a partial section on line I—I of Fig. 1.

Fig. 3 is a plan view of one of the revolving plates schematically illustrating the use of a plurality of stirring worms.

Fig. 4 is a vertical sectional view of a plant showing a plurality of revolving screens.

The calcium carbide leaves the storing hopper 1, passes the charging drum 2 and enters the revolving screen 3 which is caused to rotate by the shaft 4. The water is introduced through the pipe 5 provided with a number of nozzles by means of which the water is sprayed as uniformly as possible on the calcium carbide 6 contained in the revolving screen 3. By the brushes 7 and 8 the openings through which the material passes from the revolving screen 3 are permanently kept clean. The brushes are mounted in the interior and at the outside of the revolving screen 3.

By the motion of the drum 3 the residue which is formed during the gasification at the surface of the grains of calcium carbide 6 is rubbed off and falls through the openings of the drum on to the system of rotating plates 9 mounted below the drum. The plates 9 are arranged one above the other and above each there is mounted a stirring worm 10 which gradually moves the material to the bottom, while uniformly rotating it, until it reaches the collecting vessel 11 in the form of dry pulverulent lime. From time to time the lime is discharged from vessel 11.

It is obvious that instead of one worm, several worms may be arranged above each plate as shown in Fig. 3; the worms may also be substituted by rakes or scrapers or other means which move the material over the plates.

The acetylene produced leaves the generator, passes through the tube 12 and enters into the condenser and the gas holder from which it is distributed to the consumer.

In addition to the revolving screen 3, further drums of the same kind may also be mounted in positions adjacent to one another as shown in Fig. 4. It is also possible to replace the system of plates 9 the number of which may be chosen according to the conditions required in each case, by equivalent devices, for instance plates of large area, and, therefore, having a large operative surface; the material placed thereon is kept in motion in known manner.

We claim:

1. A device for generating acetylene from calcium carbide and water, the quantity of water added being limited so that a pulverulent residue is obtained which apparatus comprises at least one revolving screen for the reception of the calcium carbide to be gasified, a water inlet pipe arranged above the axis of each revolving screen and having at least one exit opening so that only the carbide within this screen is moistened, at least one revolving plate mounted below the revolving screen and at least one means mounted above the plate for moving the reacting material over the plates and a casing enclosing all the aforesaid parts.

2. A device for generating acetylene from calcium carbide and water, the quantity of water added being limited so that a pulverulent residue is obtained which apparatus comprises at least one revolving screen for the reception of the calcium carbide to be gasified, a water inlet pipe having at least one exit opening, at least one revolving plate mounted below the revolving screen and at least one stirring worm mounted above the revolving plate and a casing enclosing all the aforesaid parts.

3. A device for generating acetylene from calcium carbide and water, the quantity of water added being limited so that a pulverulent residue is obtained which apparatus comprises at least one revolving screen for the reception of the calcium carbide to be gasified, cleaning means in contact with the walls of the revolving screen, a water inlet pipe having at least one exit opening, at least one revolving plate mounted below the revolving screen and at least one means mounted above the plate for moving the reacting material over the plate and a casing enclosing all the aforesaid parts.

4. A device for generating acetylene from calcium carbide and water, the quantity of water added being limited so that a pulverulent residue is obtained which apparatus comprises at least one revolving screen for the reception of the calcium carbide to be gasified, brushes or scrapers in contact with the walls, of the revolving screen, a water inlet pipe having at least one exit opening, at least one revolving plate mounted below the revolving screen and a device mounted above the plate for moving the reacting material over the plate and a casing enclosing all the aforesaid parts.

5. A device for generating acetylene from calcium carbide and water, the quantity of water added being limited so that a pulverulent residue is obtained which apparatus comprises at least one revolving screen for the reception of the calcium carbide to be gasified, brushes or scrapers in contact with the walls of the revolving screen, a water inlet pipe having at least one exit opening, at least one revolving plate mounted below the revolving screen and at least one revolving worm mounted above the plate for moving the reacting material over the plate and a casing enclosing all the aforesaid parts.

6. A device for generating acetylene from calcium carbide and water, the quantity of water added being limited so that a pulverulent residue is obtained, which apparatus comprises at least one revolving screen for the reception of the calcium carbide to be gasified, cleaning means in contact with the walls, of the revolving screen, a water inlet pipe having at least one exit opening, at least one revolving plate mounted below the revolving screen and at least one means mounted above the plate for moving the reacting material over the plate and a casing enclosing all the aforesaid parts.

7. A device for generating acetylene from calcium carbide and water, the quantity of water added being limited so that a pulverulent residue is obtained, which apparatus comprises at least one revolving screen for the reception of the calcium carbide to be gasified, cleaning means of a material not forming sparks in contact with the walls, of the revolving screen, a water inlet pipe having at least one exit opening, at least one revolving plate mounted below the revolving screen and at least one means mounted above the plate for moving the reacting material over the plate and a casing enclosing all the aforesaid parts.

8. A device for generating acetylene from calcium carbide and water, the quantity of water added being limited so that a pulverulent residue is obtained, which apparatus comprises at least one revolving screen of a material not forming sparks for the reception of the calcium carbide to be gasified, cleaning means of a material not forming sparks in contact with the walls, of the revolving screen, a water inlet pipe having at least one exit opening, at least one revolving plate mounted below the revolving screen and a device mounted above the plate for moving the reacting material over the plate and a casing enclosing all the aforesaid parts.

9. A device for generating acetylene from calcium carbide and water, the quantity of water added being limited so that a pulverulent residue is obtained, which apparatus comprises a revolving screen for the reception of the calcium carbide to be gasified, a water inlet pipe having several exit openings, several plates mounted below the revolving screen and a stirring worm mounted above each plate for moving the reacting material over the plates and a casing enclosing all the aforesaid parts.

HERMANN HOLLER.
OTTO MUES.